(12) United States Patent
Penttimies (10) Patent No.: US 11,167,443 B2
(45) Date of Patent: Nov. 9, 2021

(54) FEED ROLLER ASSEMBLY (71) Applicant: Timo Penttimies, Ylamaa (FI)

(72) Inventor: Timo Penttimies, Ylamaa (FI)

( * ) Notice: Subject to any disclaimer, the term of this patent is extended or adjusted under 35 U.S.C. 154(b) by 292 days.

(21) Appl. No.: 16/251,499

(22) Filed: Jan. 18, 2019

(65) Prior Publication Data

US 2019/0152090 A1 May 23, 2019

Related U.S. Application Data

(63) Continuation-in-part of application No. 14/386,041, filed as application No. PCT/FI2013/050410 on Apr. 15, 2013, now abandoned.

(30) Foreign Application Priority Data

Apr. 20, 2012 (FI) .................................... 20120072

(51) Int. Cl.
 *B27B 25/02* (2006.01)
 *A01G 23/00* (2006.01)
 *B27B 25/08* (2006.01)

(52) U.S. Cl.
 CPC ............ *B27B 25/02* (2013.01); *A01G 23/003* (2013.01); *B27B 25/08* (2013.01)

(58) Field of Classification Search
 CPC .... A01G 23/003; A01G 23/08; A01G 23/083; A01G 23/085; A01G 23/093; A01G 23/095; B27B 25/00; B27B 25/02; B27B 31/00; B27L 1/08; B27L 1/12; B27L 1/122; B27L 1/125; B27L 1/127; B27L 11/002;

(Continued)

(56) References Cited

U.S. PATENT DOCUMENTS

| 1,180,676 A | * | 4/1916 | Snyder | .................... B27B 25/02 144/250.1 |
| 1,549,855 A | | 8/1925 | Cote | |

(Continued)

FOREIGN PATENT DOCUMENTS

| FI | 8356 | 8/2009 |
| GB | 406984 | 9/1934 |

(Continued)

OTHER PUBLICATIONS

International Search Report; Application No. PCT/FI2013/050410; dated Jul. 8, 2013.

(Continued)

*Primary Examiner* — Matthew Katcoff
*Assistant Examiner* — Smith Oberto Bapthelus
(74) *Attorney, Agent, or Firm* — Fildes & Outland, P.C.

(57) ABSTRACT

A feed roller assembly of a harvester head of a forestry machine includes a pivoted arm operated by a hydraulic cylinder and a feed roller and one operating device attached to the pivoted arm having an attachment hub driving the feed roller, the feed roller includes at least one attachment flange, at least two toothed discs, spacer pieces between at least the attachment flange and the toothed discs, attachment bolts connecting the attachment flange, the toothed discs, and the spacer pieces to form the feed roller as a bolted construction, and a cleaning comb attached to the arm for cleaning gaps formed between each pair of components when the feed roller is rotating.

31 Claims, 8 Drawing Sheets

(58) Field of Classification Search
CPC ...... B27L 11/005; B27L 11/007; B27L 11/02; B27L 11/04; B27L 11/06; B27L 11/08
USPC ............... 144/246.1, 248.7; 198/28, 37, 780, 198/781.1, 785, 788, 781.08; 241/92, 166
See application file for complete search history.

(56) References Cited

U.S. PATENT DOCUMENTS

| | | | |
|---|---|---|---|
| 2,326,076 | A | 8/1943 | Solem |
| 4,706,722 | A * | 11/1987 | Silcox .................... B27M 1/006 144/24.1 |
| 4,836,254 | A * | 6/1989 | Ruddick ................ B27M 1/006 100/121 |
| 5,148,843 | A | 9/1992 | Cote |
| 5,368,078 | A | 11/1994 | Rupe |
| 5,931,247 | A | 8/1999 | Peterson |
| 5,944,078 | A | 8/1999 | Lindholm |
| 6,253,813 | B1 | 7/2001 | Kube et al. |
| 6,453,959 | B1 | 9/2002 | Johnson et al. |
| 7,163,164 | B2 * | 1/2007 | Diaz .................... B02C 18/148 241/36 |
| 7,980,502 | B2 | 7/2011 | Doppstadt et al. |
| 9,232,701 | B1 | 1/2016 | Peterson |
| 2008/0128051 | A1 | 6/2008 | Isley et al. |
| 2010/0313997 | A1 * | 12/2010 | Quirke .................... B27B 25/02 144/4.1 |

FOREIGN PATENT DOCUMENTS

| | | |
|---|---|---|
| KR | 10-0983419 | 9/2010 |
| SU | 620370 | 7/1978 |

OTHER PUBLICATIONS

English abstract for KR 10-0983419.
English abstract for SU 620370.
English language machine translation of FI 8356.

* cited by examiner

FEED ROLLER ASSEMBLY

CROSS REFERENCE TO RELATED APPLICATIONS

This application is a continuation-in-part of U.S. application Ser. No. 14/386,041 filed Sep. 18, 2014, which is a national stage application of PCT/FI2013/050410 filed Apr. 15, 2013 claiming priority from Finnish Application No. FI U20120072 filed Apr. 20, 2012.

TECHNICAL FIELD

The present invention relates to a feed roller assembly of a harvester head of a forestry machine, the feed roller assembly comprising a pivoted arm operated by a hydraulic cylinder and a feed roller having a first end and a second end and one operating device attached to the pivoted arm having an attachment hub driving the feed roller connected to the attachment hub from the first end and leaving the second end, which is opposite to the attachment hub, exposed to open space, the feed roller comprising     at least one attachment flange for attaching the feed roller to the operating device, and     at least two toothed discs attached to the attachment flange, which toothed discs are arranged to act as gripping surfaces against a tree.

BACKGROUND OF THE INVENTION

In drive and feed devices used in connection with tree processing, sets of feed rollers are required, with the aid of which the tree being processed is moved in the longitudinal direction of the work machine. Supported by the feed rollers, the tree is moved in the longitudinal direction, in such a way that the transfer movement comes from the rotation movement of the feed rollers. At the same time, for example, branches are stripped from a tree in a harvester head. In terms of operation, it is important that the feed roller should move the tree in a centering manner supported by the feed rollers and the grip should be sufficiently strong that sufficient power is available for the moving and stripping of the tree. The construction of the feed roller should be implemented in such a way that it keeps the tree under control laterally and prevents the tree from falling off the drive surface of the feed rollers. This property is required particularly when the same device is used to process trees of different sizes. The toothing of the feed roller should have such a structure that it will give a good grip on the tree, without damaging the tree's surface too deeply. The feed roller and the toothing should grip the tree's surface well and maintain the grip during driving without slipping, to that grooves will not be cut into the surface of the tree if the feed roller slips.

Damage to the feed roller of a harvester, for example, should the feed roller strike a stone, will weakening the grip of the feed roller. Wear of the toothing will also weaken the effectiveness of the feed roller and the harvester grab to feed trees. This is intensified in trees with many branches. Running treetops to a minimum thickness is also reduced considerably. In many harvesters, for reasons of construction the edge area of the feed roller is particularly liable to impacts. The edge area of the feed roller is especially important for ensuring the effective feed of a tree precisely in the area of the treetop, or in trunks with an otherwise thin diameter.

The implementation of the construction of the feed rollers in such a way that the feed roller comprises a cylindrical metal jacket, which is attached to a hub flange, in which there is an attachment surface for the hub of a motor or drive device, is known from Finnish utility model FI 8356. In these feed rollers, the toothing is usually implemented by attaching the toothing to the metal jacket by welding. It is further known to manufacture toothing on top of a cylindrical jacket by attaching rings, in which the toothing varies, to the jacket. Known solutions are to use in feed rollers flexible parts, such as rubber wheels, to the surface of which driving elements are attached. One known construction comprises a metal jacket and a metal frame component, which are attached to each other by a vulcanized rubber tire.

In the known solutions, a problem is the fixed structures, which are difficult in terms of the maintenance of the feed roller. In constructions of the prior art, replacing the toothing demands special expertise and the use of machining and welding machines. In addition, the known feed rollers are constructed in such a way that they are suitable only for a specific application and cannot be adapted in any other way. In addition, the known feed rollers are liable to wear in the toothing.

SUMMARY OF THE INVENTION

The present invention is intended to create a feed roller assembly, which is more versatile and easily maintained than the feed roller assemblies of the prior art. In addition a further objective of the invention is to create a feed roller assembly that is easier to maintain clean than the feed roller assemblies of the prior art. The feed roller assembly according to the invention can be assembled in the desired best order possible for the intended use and application. The feed roller assembly according to the present invention is characterized by a feed roller assembly of a harvester head of a forestry machine, which assembly comprising a pivoted arm operated by a hydraulic cylinder and a feed roller having a first end and a second end and one operating device attached to the pivoted arm having an attachment hub driving the feed roller connected to the attachment hub from the first end and leaving the second end, which is opposite to the attachment hub, exposed to open space, the feed roller comprising at least one attachment flange attaching the said feed roller to the attachment hub of the operating device, at least two toothed discs having an opening in the center of the toothed discs for fitting the attachment hub partly through the toothed disc, which said toothed discs are arranged to act as gripping surfaces against a tree, wherein the attachment flange and the toothed discs each have 6-12 guide holes placed circumferentially around the attachment hub, spacer pieces between at least the attachment flange and the toothed discs, attachment bolts connecting the attachment flange, the toothed discs, and the spacer pieces to form the feed roller as a bolted construction, wherein the attachment bolts are arranged through the guide holes of both the attachment flange and the toothed discs as well as the spacer pieces securing the attachment flange, the toothed discs and the spacer pieces to each other, and a cleaning comb attached to the arm for cleaning gaps formed between each pair of components when the feed roller is rotating, the components being the attachment flange and the toothed discs.

In the feed roller assembly according to the invention, the damaged part area of a feed roller can be easily replaced with a new one, thanks to the attachment means that hold the feed roller together. It is also possible to move the damaged part of the feed roller, preferably the toothed disc, to a less important area in terms of the feed of the tree, as the toothed discs and attachment flange are attached to each other detachably. It is possible to assemble the feed roller to be of a desired width, by placing a specific number of toothed discs in the feed roller and using spacer pieces of the desired width. The placing of the feed roller in the hub of the operating device can be set according to where the attachment flange is located in the feed roller. In this connection, it should be understood that some of the toothed discs can be attached to the attachment flange by means of other toothed discs, i.e. the attachment flange can also be outermost, the toothed discs being attached to only one side of it.

The exemplary feed roller assembly can be the following: toothed disc-spacer piece-attachment flange-spacer piece-toothed disc-spacer piece-toothed disc. Locking means, which secure the parts to each other, run through all the parts.

In traditional feed rollers, the feed roller remaining clean depends on conditions, the species of tree, and other similar factors. Blocking of the gaps between the toothed discs, and the consequent weakening of the operation of the toothing, can be prevented with the aid of the cleaning comb.

According to an embodiment the spacer pieces are between each pair of components, the components being the attachment flange and the toothed discs. Gaps are then formed between each component. It must be understood that a single component may also be formed by two individual toothed discs placed in contact with each other.

The feed roller can include 3-12 toothed discs, preferably 4-6 toothed discs. The use of a sufficient number of toothed discs will reduce the surface pressure of individual toothed discs reduced and improve the grip on the tree.

The attachment flange can include a guide hole for aligning the attachment flange and the toothed discs relative to each other, with the aid of the spacer pieces. The guide hole facilitates the assembly of the feed roller and thus also accelerates maintenance operations.

According to one embodiment, there are 6-12 guide holes, preferably 8-10 guide holes in each toothed disc. With the aid of the guide holes, the structure of the feed roller is made extremely rugged.

A hub hole and attachment holes can be machined in the attachment flange for attaching the feed roller to the operating device. In the harvester grabs on the market, there are feed rollers of different sizes, of which many have the same size of diameter, but are usually of different widths. In the present invention, the same modular toothed discs can be used in many feed rollers. The attachment of the feed roller to the operating device rotating the feed roller, for example a hydraulic motor, varies motor-specifically. By altering the hub hole, it is easy to manufacture different attachment flanges to suit many different types of operating device.

In this particular invention, the attachment flange of the feed roller can also be exploited by equipping it with the same toothing as the other toothed discs. The attachment flange can also differ only in the attachment-plate bolted joints designed for this purpose.

In the toothed disc, there can be an opening in the center for fitting the hub belonging to the operating device partly through the toothed disc. This opening permits the attachment flange to be in the middle of the toothed discs.

In the assembly of the feed roller, the toothed discs can be placed asymmetrically on both sides of the attachment flange. This will permit the feed roller to be adapted to better suit its purpose.

Alternatively, it can be possible to place the toothed discs in the assembly of the feed roller symmetrically on both sides of the attachment flange. The construction assembled from the feed roller's toothed discs, attachment flange, and spacer pieces permits various types of variation.

According to one embodiment, the attachment flange and toothed discs are manufactured from a steel alloy, which is heat treated to improve wear resistance and strength, which steel is alloyed from the following materials: Cr, Ni, Mo, C, Mn. Components manufactured from steel of this kind are extremely wear resistant and their strength can be exploited to the full with the aid of laser cutting.

According to one embodiment, the components are manufactured form conventional steel, the wearing parts of which are tempered later. By using such a construction manufacturing costs can be saved.

The toothed discs are preferably manufactured by laser cutting from a steel, which has a strength of 1200-2000 $N/mm^2$, preferably at least 1500-2000 $N/mm^2$. In terms of manufacturing technique, the construction according to the invention allows the attachment flange and toothed discs to be made from an extremely strong material, preferably highly-alloyed steel, which is heat treated for wear and impact resistance. In addition, after laser cutting, the cut surface oxidizes to become even harder. The sheet, from which the toothed discs are cut, can be selected with the material and thickness that best suitable the purpose in question, as laser cutting does not substantially soften the material, nor does it have limitations relative to the hardness of the material in the same way as welding. The shape of the toothing of the toothed disc can also be formed to support the tree better, for example, by using a laser-cutting device with a cutting head that can be tilted.

According to one embodiment, the spacer pieces are sleeves, in which a shoulder is machined. With the aid of the shoulders, the sleeves remain firmly in place and stiffen the structure. The spacer pieces receive the support forces assisted by the attachment means. By altering the length of the sleeves, the protrusion of the feed rollers from the attachment hub of the drive motors can be set to a suitable distance. The length of the sleeves can be varied and in this way the width of the feed roller can also be adjusted to suit the purpose at the time. The width of the feed roller is also affect by the number and thickness of the toothed discs and attachment flanges.

The construction of the spacer pieces can vary. In addition to the components with shoulders that are turned on a lathe, spacer pieces can also be made without a shoulder (for example, a cut length of a material tube). This is extremely simple and cheap to manufacture and can be made with lower material costs using a thinner material. The aforementioned structure achieves the advantage of a cheaper construction.

The spacer piece can also be a ring equipped with large protrusions, which are fitted into holes machined in the toothed discs.

According to another embodiment, the spacer pieces are discs, in which there are shoulders. Shoulders can be made in the disc, which align the spacer pieces relative to the toothed discs. With the aid of the disc it is possible to achieve a very rugged and stiff structure.

According to one embodiment, a toothed disc, to which are attached studding or widening parts for preventing a tree from falling off the feed roller, is attached to the sides of the feed roller. This will ensure that the feed roller will be given good mass handling properties, as the studding keeps the trees effectively between the feed rollers. The widenings can be like those known from the prior art, for example, transfer studs or similar.

The attachment means can be attachment bolts and their counter-nuts. Such an attachment is cheap and easy to implement. In this way, the toothed discs of the feed roller can also be easily rotated to different positions, in order to minimize the drawbacks caused to the toothed discs of the feed roller by damage to a large, extensive area. With the aid of the attachment bolts and counter-nuts, conventional welded structures can be easily attached to the feed roller, in order to achieve the desired properties in the feed roller. For example, it is possible to refer to the installation of so-called finger structures for improving the mass-handling properties of the feed roller.

The cleaning comb are preferably attached to the original attachment points of the harvester head. The attachment can then be implemented simply and reliably.

According to one embodiment, the feed roller assembly further includes a feed-roller guard, to which the cleaning comb are attached. In this case, the attachment of the cleaning comb can be implemented without separate support structures. The cleaning comb can also be attached to a separate support structure.

In the invention, the feed roller is equipped with a cleaning comb, which will always keep the feed roller clean in all conditions. Thus, the feed properties of the tree do not diminish. The cleaning comb can be manufactured by welding or by machining. An adjustable comb structure is also possible, in which, for example, the depth of the cleaning comb can be adjusted. The adjustment can take place, for example, by means of adjustment plates to be installed between the feed-roller guard and the cleaning comb.

The toothing preferably includes individual teeth. Feeding a tree in a grab demands that the feed roller grips the tree firmly, but at the same time does not cause excessively deep or extensive damage in the tree.

According to an embodiment in each tooth there is a spike for gripping the tree and a shoulder for limiting the bite of the spike. In traditional feed-roller constructions, the bite of the spike into the tree depends on many factors, such as the gripping pressure used in the feed rollers, or the hardness of the tree. Control of the bite is thus difficult. In this feed-roller construction, the bite is controlled with the aid of shoulders in the base of the spike. The width of the shoulder can vary according to the biting-prevention requirement at the time. The length of the spike too in the manner required by the intended use can also be easily controlled, thanks to the flexible laser-cutting method. The number of spikes too, which also affects the grip and bite into the tree, can be altered easily. During manufacture, the length of the spike can be easily adjusted to suit the requirements in each case by altering the location of the biting-prevention shoulder in the radial direction of the feed roller.

The spike is preferably an integrated part of each toothed disc. This makes the toothed disc easier to manufacture.

In the large and few spikes according to the prior art, there is the problem that they easily break the tops of thin trees by turning the tree crosswise when reversing when they strike, for example, a branch of the tree. The spikes of the feed roller assembly according to the invention are small in size and many in number, which ensures that the feed roller has good reversing properties, while they do not break the tops by turning them crosswise.

The toothed disc preferably includes toothing, which is symmetrical independently of the direction of rotation of the toothed disc. If required, the construction of the symmetrical spike can also be altered by changing the shape or angle of the spike, for example, to grip more firmly when feeding forwards and to grip less firmly when reversing the tree.

The spikes of the tooth are also easy to sharpen. In the various areas of the feed roller, various combinations of material thicknesses, or number of spikes, or shapes can be installed, in order to achieve the necessary properties. By altering the number of spikes in the toothed disc, the stepping in adjacent toothed discs can be altered as desired. It is also possible to use even stepping, or if desired, for example, half stepping, or other stepping. When using half stepping, the spikes will detach from the tree at different times when the feed roller rotates, so that less bark will adhere to the feed roller.

In order to reduce the weight of the feed roller, it is also possible to manufacture the spacer pieces from aluminum.

According to one embodiment, it is also possible, in terms of construction, to used toothed discs of different size in the same feed roller. In this way, it is possible to control effectively the direction of the forces acting on the tree.

The shape of the spike of the tooth can vary considerably, because a precise trace can be obtained by means of laser cutting. The sharp spikes of the feed roller assembly according to the invention grip the surface of the tree with a low surface pressure and only bite to the desired depth, thanks to the shoulders of the teeth. With the aid of the sharp spike and the bite-limiting shoulder, toothing is created, which permits an effective grip under all circumstances. The use of a low surface pressure also reducing so-called 'diving' when handling twisty trees.

The spike can also have an uneven surface, equipped with small notches. The effect of the feeding power of the tree in lifting the spike to the surface will then decrease and the gripping pressure can be lower. Water cutting may also be possible, but in terms of manufacturing costs this is a considerably more expensive alternative than laser cutting. Water cutting has the advantage that the material does not heat up, and thus does not soften.

According to one embodiment, the toothed discs can be manufactured from several parts. If the toothed disc is damaged, it will then be possible to replace only the damaged part of the toothed disc.

Preferably the diameter of the opening of each toothed disc is 20-60 mm larger than diameter of the hub creating a passage between each toothed disc and the hub for removal of dirt. Through the passage any dirt accumulated in the gaps between the attachment flange and the toothed discs as well as between two neighboring toothed discs can be removed. Dirt can be, for example snow or bark detached from the tree being fed.

Preferably the location of each toothed disc is fixed in relation to the hub in radial direction of the hub. Then the contact surface created by the feed roller remain the same all the time.

Naturally the diameter of each toothed disc and the attachment flange is larger than diameter of the hub.

Each toothed disc is preferably a uniform piece made of a single piece of metal. Therefore, the toothed discs are durable and easy to manufacture.

The gap between each component created by the spacer pieces can be 10-35 mm, preferably 12-24 mm. Then the gap between components is large enough to any dirt falls through the feed roller keeping it clean.

According to an embodiment the cleaning comb has a body and comb flanges attached to the body, each tooth extending in the gap between the toothed discs. The comb flanges will remove any dirt from the gaps, even if the dirt is sticky or adhesive as moist bark, for instance, may be.

Preferably each comb flange has an end and each comb flange extends in the gap so that the end of the comb flange is at a distance of 5-10 mm from the spacer piece when the spacer piece is at a line drawn between the hub and the end of the comb flange. Most preferably the distance is 7-8 mm. The cleaning comb then efficiently removes any dirt from the gaps but there is also a safe tolerance so that the spacer pieces never touch the comb flanges of the cleaning comb.

Preferably the feed roller comprises a second arm attached to the pivoted arm to which second arm the cleaning comb is fixedly attached. The second arm keeps the cleaning comb in a fixed position in relation to the rotating feed roller.

The stepping of the toothing of adjacent toothed discs can also differ from that of each other, in which case considerably less bark will adhere between the toothed discs, as the toothed discs will not pull the bark along with them. The stepping of the toothing can be affected by altering the number of guide holes of the toothed disc and the number of teeth of the toothing used in the toothed disc. Generally, for example, there are 36 teeth when using eight guide holes in the toothing, 40 teeth when using nine guide holes, and 44 teeth when using ten guide holes. In this way, the stepping can be altered without needing to manufacture two different types of toothed discs.

According to an embodiment each tooth has an offset in the tangential direction of the toothed disc in relation to the guide hole. By using the offset the teeth of the toothed discs can be place either in a row in direction of the hub of the operating device or in stepping order just by selecting desired installation of the toothed discs. By stepping order it is meant that the teeth of neighboring toothed discs are in different tangential position. If the toothed disc is turned so that a plane of the toothed disc that was facing the hub is now facing away from the hub then the toothing pattern is changed.

The offset can $2/5$-$1/5$ of the tangential distance between neighboring teeth.

Preferably the offset is a quarter of the tangential distance between neighboring teeth. Then just by flipping the toothed disc the toothing pattern is changed from parallel to stepping. By "flipping" it is meant that the toothed disc is turned so that a plane of the toothed disc that was facing the hub is now facing away from the hub then the toothing pattern is changed.

The diameter of each toothed disc may be 300-600 mm, preferably 350-480 mm. Then the diameter of the feed roller is large enough that at least two teeth of each toothed disc will be in contact with the tree at every moment.

The distance between each tooth of a toothed disc in circumferential direction of the toothed disc can be 35-60 mm, preferably 40-55 mm. Distance between teeth leaves enough open space between the teeth to that any dirt will no accumulate.

Preferably the length of the pivoted arm is 50-200% of the diameter of the feed roller. This means that the pivoted arm can be used with hydraulic cylinder to bring the feed roller against the tree for trees with different diameters.

The idea of the invention is to use a feed-roller construction assembled from separate toothed discs with the aid of spacer pieces, in the construction of the feed roller. With the aid of the invention, considerable advantages are obtained, in terms of the operation and maintenance of the feed roller. The feed roller can be assembled symmetrically or asymmetrically, depending of the location of the attachment flange in the center or to one or other side of the center line. The feed roller, which is assembled by means of bolt joints, can be easily serviced. A new toothed disc can be used to replace one that is worn or damaged. During servicing, the places of the toothed discs can be changed, for example, so that the toothed discs at the edges, which are the most worn and knocked/blunted, are moved to the middle. This is made possible by the construction of the feed roller, which is assembled by bolt joints and can be dismantled. The toothed discs can also be easily serviced once they have been detached. In addition, the construction of the feed roller assembly according to the invention permits the feed roller to be easily adapted according to its intended purpose. The feed roller assembly according to the invention is also lightly constructed, which facilitates the control of the feed rollers. In addition, the weight advantage that is achieved increases, if the harvester head is suspended at the end of a lifting boom.

BRIEF DESCRIPTION OF THE DRAWINGS

In the following, the invention is described in detail with reference to the accompanying drawings showing some embodiments of the invention, in which.

DETAILED DESCRIPTION OF THE INVENTION

Figure 1:
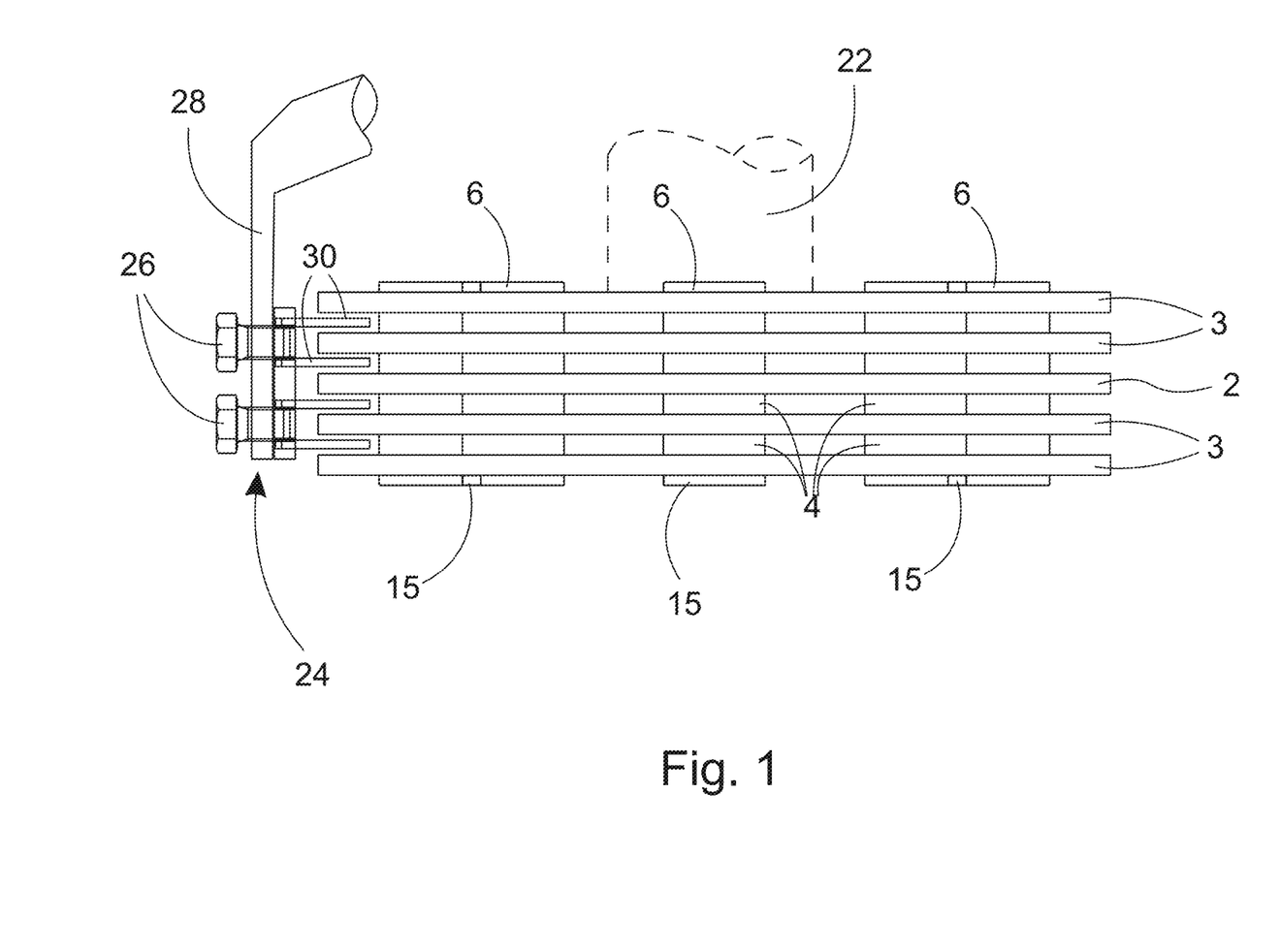
FIG. 1 shows a side view of the feed roller assembly according to the invention.

FIG. 1 shows the construction of the feed roller 1 according to the invention, which comprises one or several attachment flanges 2 and one or several toothed discs 3. The toothed discs 3 are attached to the attachment flange 2 using spacer pieces 4 and attachment means 17, i.e. in this case attachment bolts 15 and counter-nuts 6, as the joining elements. In this connection, it should be understood that at least one toothed disc 3 is attached to the attachment flange 2, to which said toothed disc 3 the other toothed discs 3 can be attached. The toothed discs 3 are attached to the attachment flange 2 of the feed roller 1 in such a way that a feed roller 1 is assembled, in which there are toothed discs 3 relative to the attachment flange 2 in such a way that the feed roller 1 is located correctly to the power-transmission shaft, or the hub 22 of the operating device.

Figure 2:
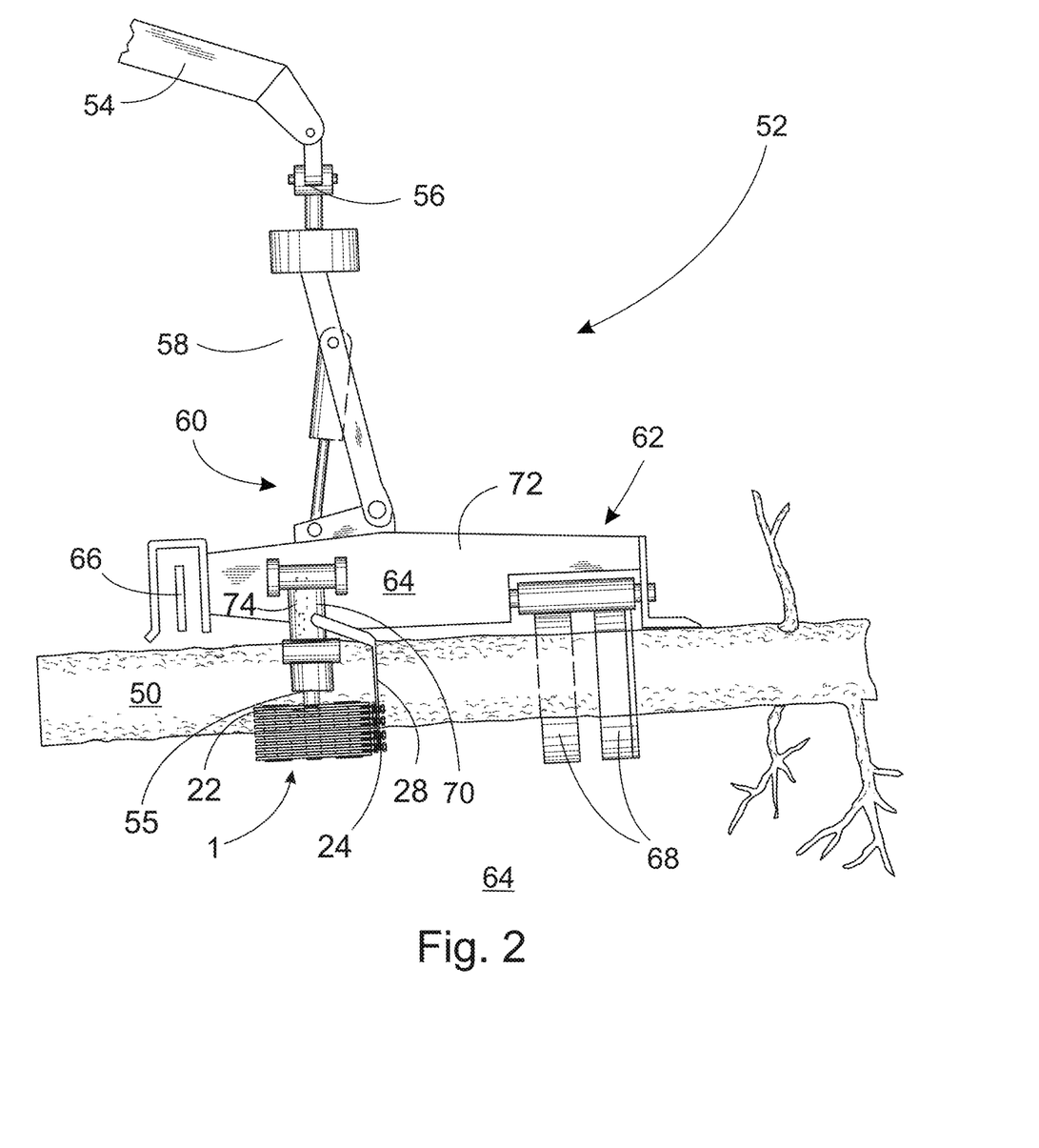
FIG. 2 shows the feed roller assembly according to the invention attached to a harvester head in its working position.

FIG. 2 illustrates the feed roller assembly according to the invention as a part of a harvester head 62. In this illustrative embodiment the harvester head 62 is hung from a boom 54 of a work machine using a pivot 56 of a rotating device 58 and a wide-angle pivot 60. The harvester head 62 comprises a frame 64, delimbing arms 68, cutting device 66 and the feed roller assembly according to the invention. The feed roller assembly includes an pivoted arm 70, which is attached to the frame 64 of the harvester heads 62, a feed roller 1 for feeding the tree 50 to the cutting device 66 as well as an operating device 55 having a hub 22 for rotating the feed roller 1. The pivoted arm 70 is operated by a hydraulic cylinder 74 pivoted between the frame 64 of the harvester head 62 and the pivoted arm 70. The feed roller 1 is attached to the hub 22 of the operating device 55. In FIG. 1 the harvester head 62 is in its operating position where it delimbs the tree and cuts it into logs.

According to FIG. 1, the feed roller assembly includes cleaning comb 24 for cleaning tree bark from the gaps between the toothed discs 3 and the attachment flange 2. Because the toothed discs 3 and the attachment flange 2 are arranged with a small gap between them with the aid of the spacer pieces 4, space remains between the adjacent toothed discs 3 and the toothed disc 3 and attachment flange 2. When using the feed roller to move a tree, the toothing of the toothed discs bites into the tree, when the bark of the tree enters this aforementioned space. Bark remaining in this space can finally become packed against the surface of the spacer pieces, preventing the toothing 7 from biting effectively into the bark of the tree. According to FIG. 1, the cleaning comb 24, which includes individual comb flanges 30. The comb flanges are shaped in such a way as to conform in shape to the annular path of the spacer pieces when the feed roller rotates. In other words, viewed parallel to the rotational axis of the feed roller, the surface of the comb flanges closest to the spacer pieces of the feed roller is the same shape as the line of rotation of the feed roller. Thus, the comb flanges are the same distance from the surface of the spacer pieces over the entire length of the comb flange.

The cleaning comb 24 is preferably attached via a second arm to the pivoted arm 70 of the feed roller assembly. The second arm is preferably a feed-roller guard 28 shown in FIG. 1, which is generally always a permanent component of the feed roller. The guard 28 is intended to protect the feed roller from impacts. The cleaning comb 24 can be attached with the aid of bolts 26, which at the same time attach the comb flanges 30 to the guard 28. The comb flanges 30 act like the teeth of a comb between the toothed discs 3, which by remaining stationary remove tree bark and other rubbish that has adhered between the rotating toothed discs. FIG. 1 uses broken lines to show the hub 22 of the operating device.

Figure 3:
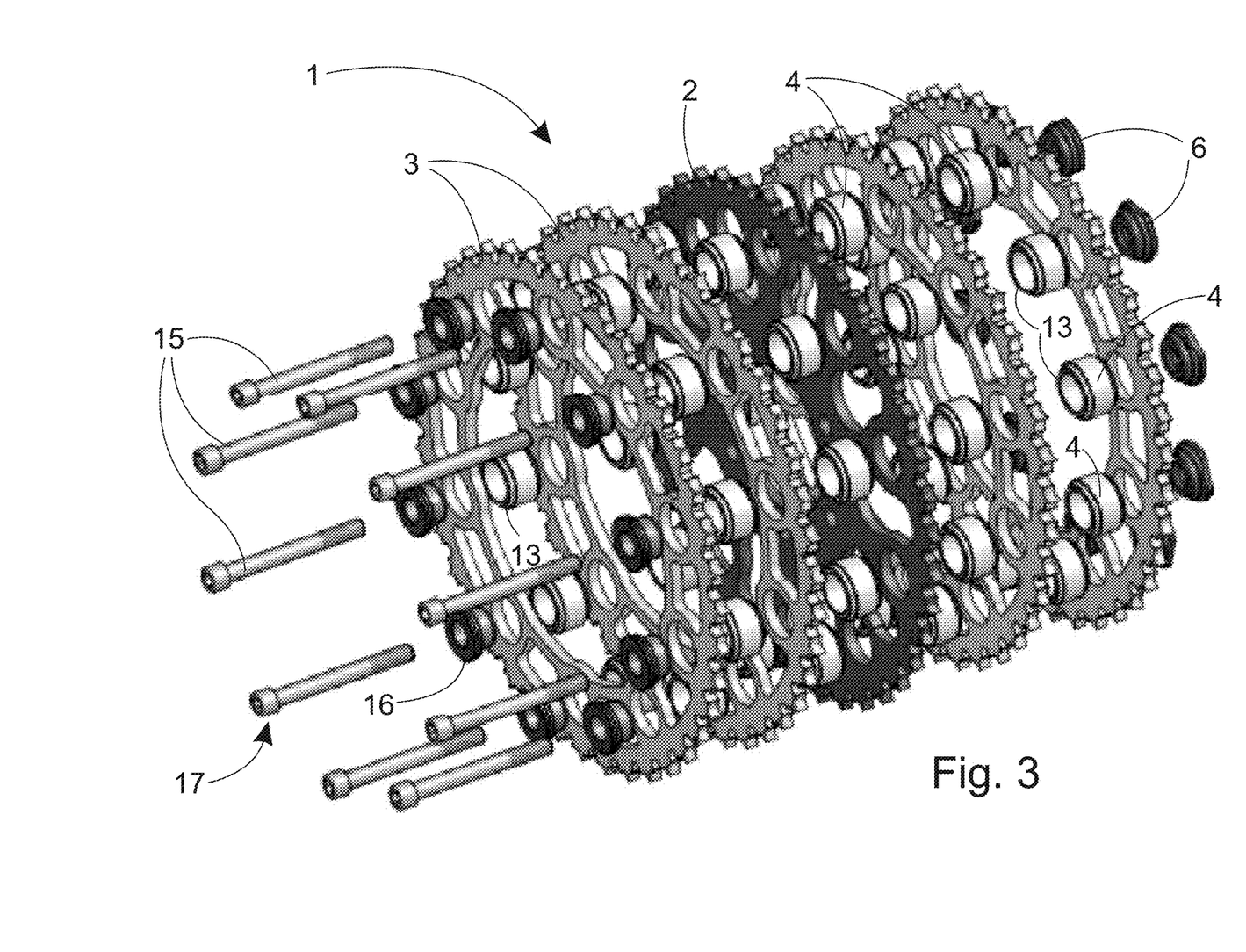
FIG. 3 shows an exploded view of the construction of the feed roller assembly according to the invention.

FIG. 3 shows an axonometric exploded view of the assembly of the attachment flange 2, the toothed discs 3, and the spacer pieces 4 of the feed roller 1, to form a unified structure with the aid of attachment bolts 15, support sleeves 16, and counter-nuts 6. According to FIG. 3, the attachment flange 2, the toothed discs 3, and the spacer pieces 4 together form a pack of toothed discs, which is the feed roller 1. The spacer pieces 4 are attached with the aid of the toothed discs 3 and the shoulders 13 of the attachment flange, which prevent the spacer pieces moving in the direction of the plane of an individual toothed disc.

According to FIG. 3, toothing 7, which is formed of individual teeth 7', is preferably formed in the attachment flange 2 of the feed roller 1 of the assembly according to the invention. In order to create a good grip, sharp spike 8 and a widened tooth shoulder 9 are shaped in each individual tooth 7'. The spike can also be referred to as a point and the shoulder of the tooth as the base part of the tooth. A hub hole 10 and attachment holes 11 are made in the attachment flange 2, according to the hub of the drive shaft or motor. In addition, the attachment flange 2 can include guide holes 12 arranged in the shoulders 13 of the spacer pieces 4.

Figure 4:
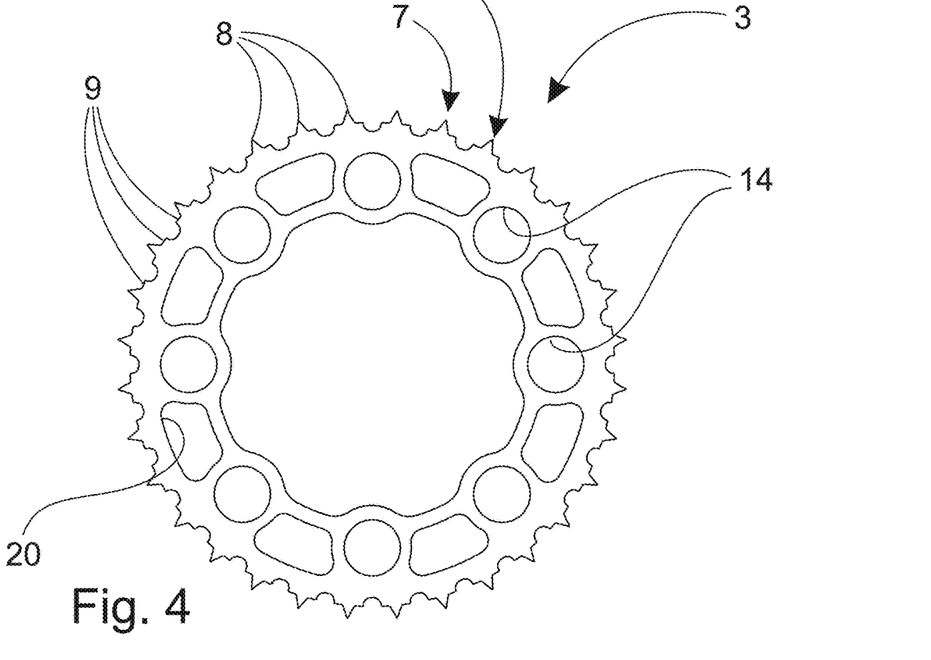
FIG. 4 shows the construction of the attachment flange of the feed roller assembly according to the invention.
Figure 5:
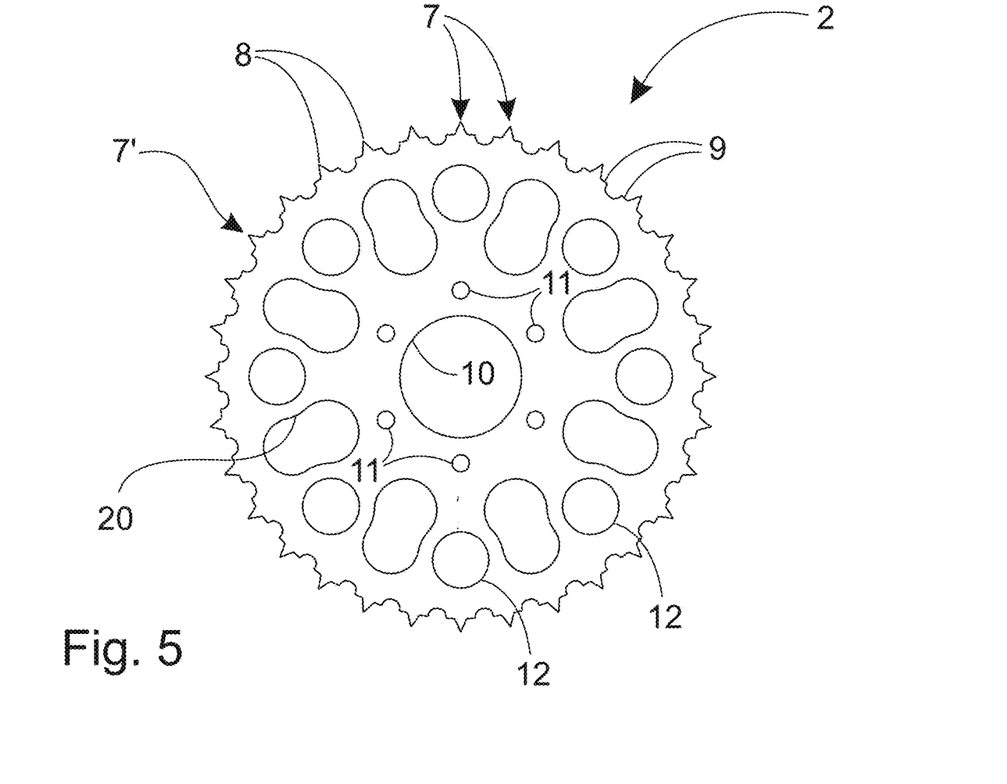
FIG. 5 shows the construction of the toothed disc of the feed roller assembly according to the invention.

According to FIG. 3, the feed roller includes one or several toothed discs 3, which are attached to the attachment flange 2 with the aid of spacer pieces 4, in such a way that the shoulder 13 of the spacer piece 4 is located in the guide holes 14 of the toothed discs 3. In the toothed discs 3, there can be the same kind of toothing 7 as in the attachment flange 2. An opening 19 is made in the middle of the toothed disc 3, which is dimensioned in such a way that the hub of the drive device fits inside the opening 19. According to FIGS. 4 and 5, both the disc 3 and the attachment flange 2 can include lightening openings 20.

Figure 6:
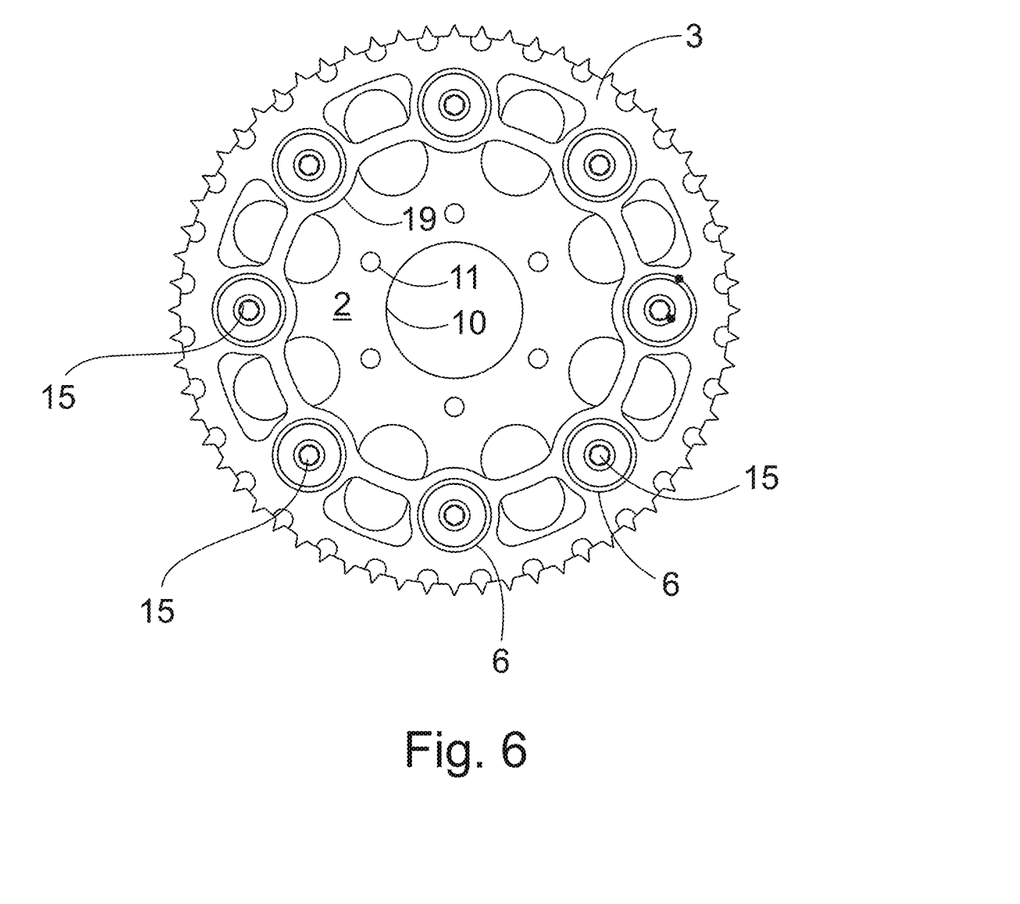
FIG. 6 shows the attachment of the toothed disc and attachment flange of the feed roller assembly according to the invention, seen parallel the longitudinal axis of the feed roller.

FIG. 6 shows in greater detail the attachment of the toothed disc 3 and the attachment flange 2 to each other, parallel to the axis of rotation of the feed roller. The hub of the operating device is attached to the attachment flange 2 with the aid of attachment holes 11. According to the figure, the opening 19 in the toothed disc 3 permits the hub of the operating device to pass through the toothed disc. According to FIG. 6, the attachment flange 2 too can include toothing, which is preferably stepped differently relative to the toothed disc, in order to improve grip. Alternatively, the attachment flange can also be made without toothing.

Figure 7:
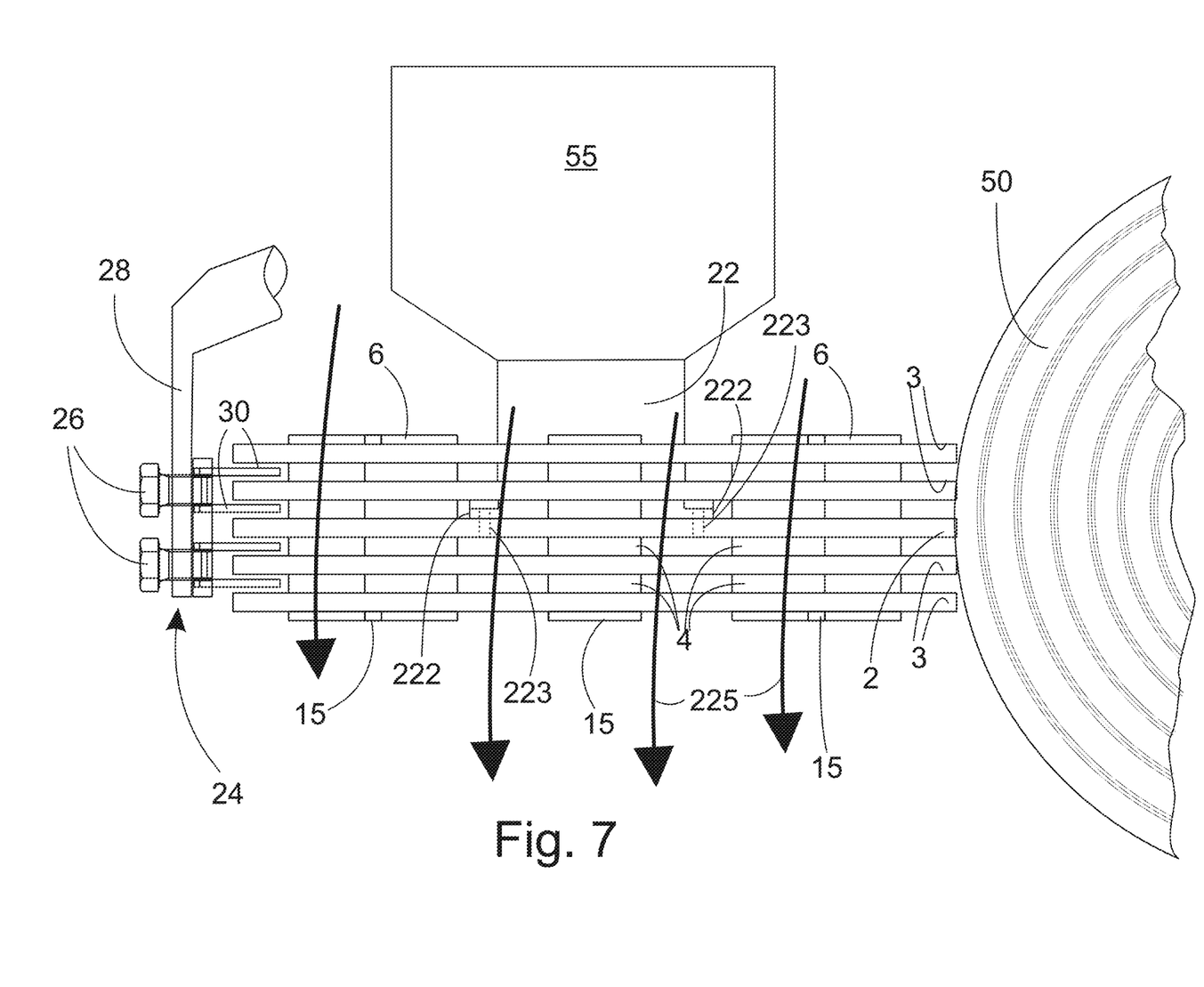
FIG. 7 shows a side view of the feed roller assembly according to the invention in use.
Figure 8:
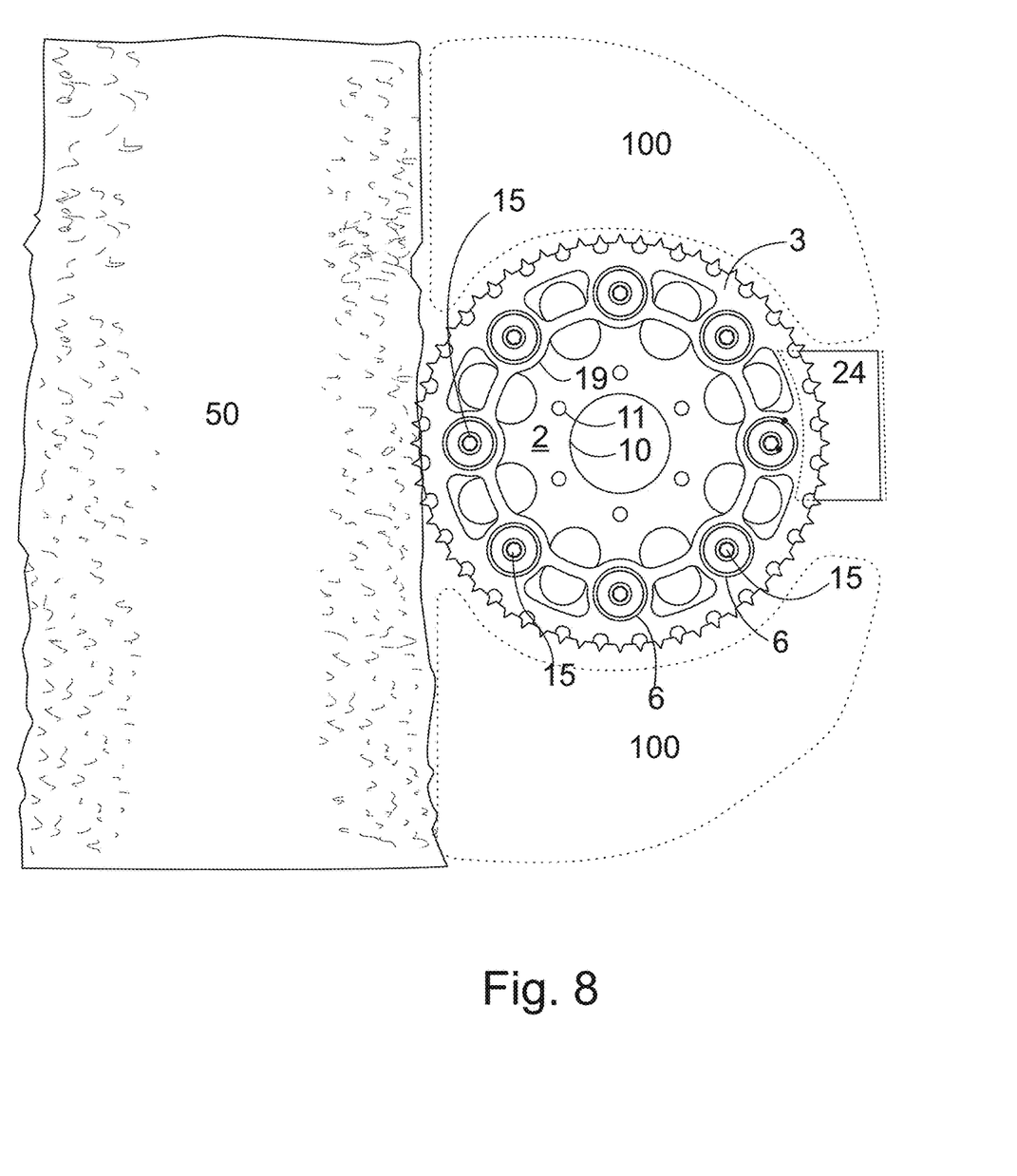
FIG. 8 shows a top view of the feed roller assembly according to the invention in use.

FIG. 7 shows the feed roller assembly according to the invention in its use position. The feed roller assembly 1 is used for feeding a tree 50 to a cutting device, for example a chainsaw, for cutting the tree trunk to a predetermined length. During feeding the tree 50 is essentially horizontal and the hub 22 of the operating device 55 rotating the feed roller 1 is then essentially vertical. The feed roller 1 is attached from its first end to an attachment hub 22 of the operating device 221. The second end of the feed roller 1, which is opposite to the attachment hub 22, is left open and exposed to open space 100 shown in FIG. 8. The attachment hub 22 preferably includes a second attachment flange 222 for attaching the attachment hub 22 to the attachment flange 2 of the feed roller 1 using bolts 223.

Figure 9:
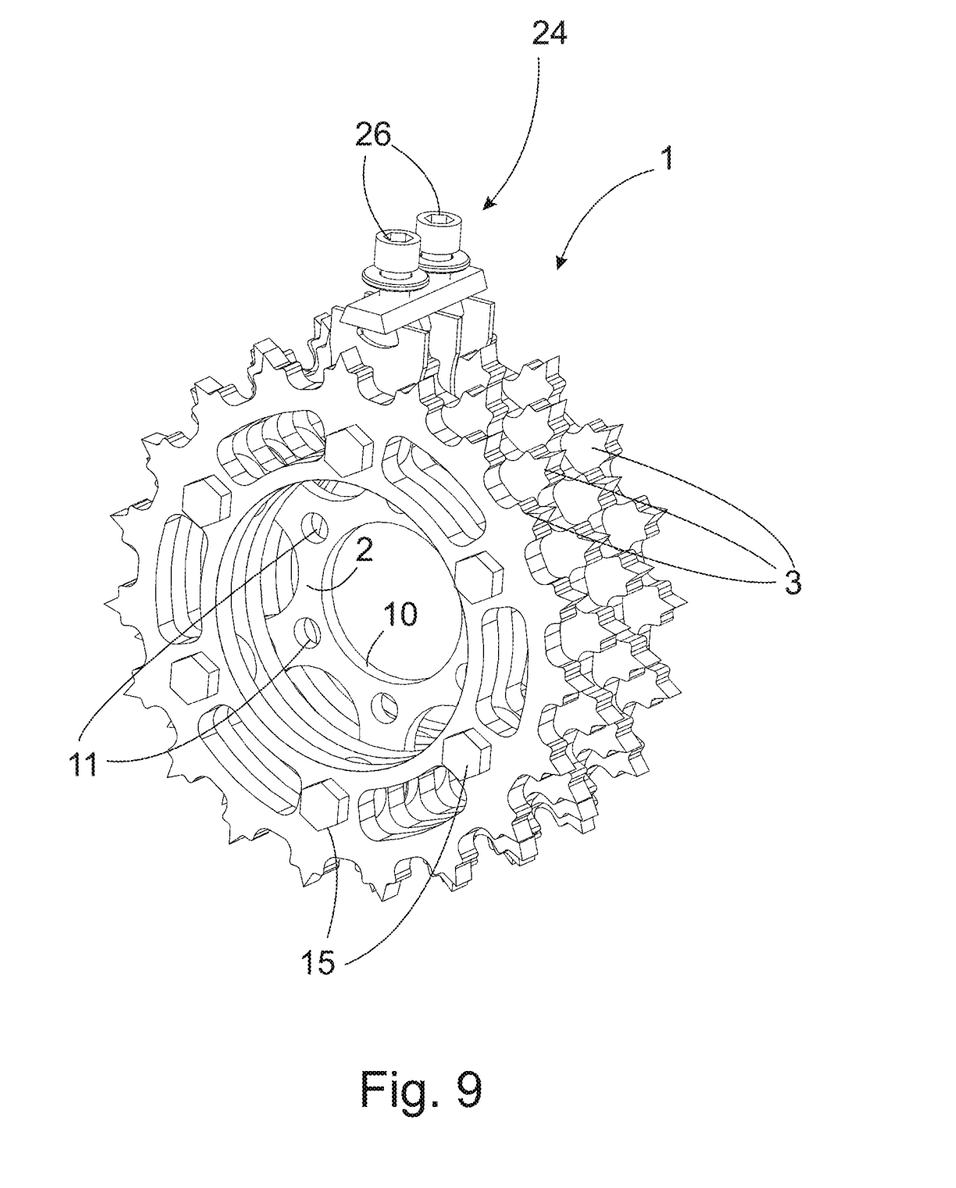
FIG. 9 shows a second embodiment of the feed roller with the cleaning comb.

As the toothed discs 3 of the feed roller 1 grip the tree 50 small pieces of bark is detached from the surface of the tree 50. In the feed roller assembly according to the invention the pieces of bark can move through the feed roller 1 as shown with arrows 225 in FIG. 7 via lightening openings 20 of the toothed discs 3 shown in FIG. 5. The lightening openings 20 also act as passages for the pieces of bark to fall through the feed roller 1 keeping clean. In addition, pieces of bark can fall off the feed roller over the sides of the feed roller in radial direction of the drive shaft of the operating device 55 since the feed roller 1 is surrounded by open spaces 100 shown in FIG. 8. The open spaces 100 surrounding the feed roller 1 also enable the use of cleaning comb 24 since the cleaning comb 24 can be attached on the outer periphery of the feed roller 1 as shown in FIG. 9. The difference between the second embodiment of the feed roller 1 shown in FIG. 9 and the first embodiment shown in FIGS. 1-8 is that in the second embodiment the spacer pieces are not equipped with shoulders as in the first embodiment.

The properties of one feeder roller of an assembly according to the invention are itemized as follows:

Manufacture of the toothed discs and/or the attachment flanges takes place by laser cutting, the material being Hardox 600, sheet thickness 10 mm. Hardox 600 is the very strong steel of the Swedish company SSAB, which has a yield strength of 1650-2000 N/mm$^2$ (conventional structural steel 335-520 N/mm$^2$), 8.8 bolt is 880 N/mm$^2$. Laser cutting does not substantially soften the structure in the same way as welding does and is suitable even with the hardness of the material Hardox 600.

Spacer pieces are manufactured automatically by machining, the material being steel or a special-strength aluminum.

The spacer pieces receive the structural forces, the bolts holding the feed roller together.

Reliable construction, over-dimensioned bolted-joints, 8-10 bolts, M14/strength 12.9.

By means of the construction, excellent grip is achieved, thanks to the numerous sharp spikes of the toothing.

Acute spike angle: the feed roller will remain in the tree with a lower pressure.

The feed rollers also have good reversing properties, due to the symmetrical structure of the toothing.

Limitation of bite with the aid of the shoulders of the tooth of the toothing prevents the spikes from sinking too deeply into the tree.

If necessary, a damaged part of a feed roller can easily be changed to a different part of the feed roller, or replaced with a new part.

New arrangements in the structure can be implemented easily, thanks to the maintenance-friendly bolted construction.

The cleaning comb of the feed roller keep the feed roller always clean, so that its grip is preserved.

Mass-handling properties have also be shown to be good.

The final result is a feed roller with good operating properties.

It must be understood that the above description and the related figures are only intended to illustrate the present invention. The details of the construction of the feed roller can vary within the scope of the inventive idea stated in the accompanying claims.

The invention claimed is:

1. Feed roller assembly of a harvester head of a forestry machine, the feed roller assembly comprising a pivoted arm operated by a hydraulic cylinder, and a feed roller having a first end and a second end, and one operating device attached to the pivoted arm having an attachment hub driving the feed roller connected to the attachment hub from the first end while the second end exposed to open space, the feed roller comprising;
   at least one attachment flange attaching the said feed roller to the attachment hub of the operating device,
   at least two toothed discs having an opening in the centre of the at least two toothed discs for fitting the attachment hub partly through the at least two toothed discs, which said at least two toothed discs are arranged to act as gripping surfaces against a tree,
      wherein the at least one attachment flange and the at least two toothed discs each have 6-12 guide holes placed circumferentially around the at least one attachment hub,
   spacer pieces between at least the at least one attachment flange and the at least two toothed discs,
   attachment bolts connecting the at least one attachment flange, the at least two toothed discs, and the spacer pieces to form the feed roller as a bolted construction, wherein the attachment bolts are arranged through the guide holes of both the at least one attachment flange and the at least two toothed discs as well as the spacer pieces securing the at least one attachment flange, the at least two toothed discs and the spacer pieces to each other, and
   a cleaning comb attached to the pivoted arm for cleaning gaps formed between each pair of components when the feed roller is rotating, the components being the at least one attachment flange and the at least two toothed discs.

2. The feed roller assembly according to claim 1, wherein at least one of said at least two toothed discs and the at least one attachment flange are manufactured by laser cutting from steel.

3. The feed roller assembly according to claim 2, wherein the strength of steel used in said at least two toothed discs and the at least one attachment flange is 1200-2000 N/mm$^2$.

4. The feed roller assembly according to claim 2, wherein the strength of steel used in said at least two toothed discs and the at least one attachment flange is 1500-2000 N/mm$^2$.

5. The feed roller assembly according to claim 1, wherein the said at least two toothed discs comprise toothing, which is symmetrical independently of the direction of rotation of the at least two toothed discs.

6. The feed roller assembly according to claim 5, wherein the toothing comprises individual teeth.

7. The feed roller assembly according to claim 6, wherein in each tooth there is a spike for gripping the tree and a shoulder for limiting the bite of the spike.

8. The feed roller assembly according to claim 7, wherein the spike is an integrated part of each of said at least two toothed discs.

9. The feed roller assembly according to claim 6, wherein the each tooth has an offset in a rotation direction of the toothed disc in relation to the guide holes.

10. The feed roller assembly according to claim 9, wherein the offset is $\frac{2}{5}$-$\frac{1}{5}$ of a distance between neighbouring teeth in the rotation direction.

11. The feed roller assembly according to claim 9, wherein the offset is a quarter of the distance between neighbouring teeth in the rotation direction.

12. The feed roller assembly according to claim 1, wherein the feed roller includes 3-9 toothed discs.

13. The feed roller assembly according to claim 1, wherein the feed roller includes 3-6 toothed discs.

14. The feed roller assembly according to claim 1, wherein the at least one attachment flange comprises toothing.

15. The feed roller assembly according to claim 1, wherein the at least two toothed discs are located in the assembly of the feed roller asymmetrically on each side of the at least one attachment flange.

16. The feed roller assembly according to claim 1, wherein a centre hole and attachment holes are machined in the at least one attachment flange, for attaching the feed roller to the operating device.

17. The feed roller assembly according to claim 1, wherein at least one of the at least one attachment flange and the at least two toothed discs are manufactured from an alloyed steel, which is heat treated in order to improve the steel's heat resistance and strength, which steel is alloyed with the following substances: Cr, Ni, Mo, C, Mn.

18. The feed roller assembly according to claim 1, wherein the said spacer pieces are sleeves, in which a shoulder is machined.

19. The feed roller assembly according to claim 1, wherein the spacer pieces are discs, in which there are shoulders.

20. The feed roller assembly according to claim 1, wherein a further toothed disc is attached to the sides of the feed roller, to which studding or widening parts are attached as widenings, in order to prevent the tree from falling off the feed roller.

21. The feed roller assembly according to claim 1, wherein the feed roller assembly further comprises a feed-roller guard, to which the said cleaning comb is attached.

22. The feed roller assembly according to claim 1, wherein a location of each of said at least two toothed discs is fixed in relation to the attachment hub in radial direction of the attachment hub.

23. The feed roller assembly according to claim 1, wherein a diameter of each of said at least two toothed discs and the at least one attachment flange is larger than diameter of the attachment hub.

24. The feed roller assembly according to claim 1, wherein each of said at least two toothed discs is a uniform piece made of a single piece of metal.

25. The feed roller assembly according to claim 1, wherein each one of said at least two toothed discs is separated from another of said at least two toothed discs by the spacer pieces.

26. The feed roller assembly according to claim 1, wherein the cleaning comb has a body and comb flanges attached to the body, each comb flange extending in the gap between the at least two toothed discs.

27. The feed roller assembly according to claim 26, wherein each comb flange has an end and each comb flange extends in the gap so that the end of the comb flange is at a distance of 5-10 mm from at least one of the spacer pieces when the at least one of the spacer pieces is at a line drawn between the attachment hub and the end of the comb flange.

28. The feed roller assembly according to claim 27, comprising a second arm attached to the pivoted arm, wherein the cleaning comb is fixedly attached to the second arm.

29. The feed roller assembly according to claim 1, wherein the spacer pieces are between each pair of components.

30. The feed roller assembly according to claim 1, wherein the gap between each component created by the spacer pieces is 10-35 mm.

31. The feed roller assembly according to claim 1, wherein a length of the pivoted arm is 50-200% of a diameter of the feed roller.

* * * * *